(12) United States Patent
Yasunaga et al.

(10) Patent No.: US 10,896,521 B2
(45) Date of Patent: Jan. 19, 2021

(54) COORDINATE CALIBRATION BETWEEN TWO DIMENSIONAL COORDINATE SYSTEM AND THREE DIMENSIONAL COORDINATE SYSTEM

(71) Applicant: TOSHIBA TEC KABUSHIKI KAISHA, Tokyo (JP)

(72) Inventors: Masaaki Yasunaga, Sunto Shizuoka (JP); Tetsuya Nobuoka, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/290,290

(22) Filed: Mar. 1, 2019

(65) Prior Publication Data
US 2019/0279399 A1 Sep. 12, 2019

(30) Foreign Application Priority Data
Mar. 8, 2018 (JP) .................. 2018-042245

(51) Int. Cl.
*G06T 7/80* (2017.01)
*H04N 13/246* (2018.01)
(Continued)

(52) U.S. Cl.
CPC .............. *G06T 7/85* (2017.01); *G06F 17/16* (2013.01); *G06T 7/33* (2017.01); *G06T 7/80* (2017.01);
(Continued)

(58) Field of Classification Search
CPC .... G06T 7/85; G06T 7/33; G06T 7/80; G06T 2207/30204; G06T 2207/10084; G06T 2207/10012; G06F 17/16; H04N 13/246
See application file for complete search history.

(56) References Cited

U.S. PATENT DOCUMENTS

| 6,101,455 A | 8/2000 | Davis | |
| 8,836,768 B1* | 9/2014 | Rafii | G06F 3/017 |
| | | | 345/420 |

(Continued)

FOREIGN PATENT DOCUMENTS

JP 2014-163833 A 9/2014

OTHER PUBLICATIONS

Yoonsu Park et al., "Calibration between Color Camera and 3D LIDAR Instruments with a Polygonal Planar Board", Sensors 2014, vol. 14, No. 3, Mar. 17, 2014, pp. 5333-5353.
(Continued)

*Primary Examiner* — Shahbaz Nazrul
(74) *Attorney, Agent, or Firm* — Kim & Stewart LLP

(57) ABSTRACT

An information processing apparatus performs coordinate calibration between a two-dimensional (2D) coordinate system and a three-dimensional (3D) coordinate system. The apparatus includes a 2D camera interface, a 3D camera interface, and a processor. The processor is configured to receive, from the 2D camera interface, first 2D image data of a flat plate at a first position and second 2D image data of the flat plate at a second position different from the first position, receive, from the 3D camera interface, first 3D coordinate information of the flat plate at the first position and second 3D coordinate information of the flat plate at the second position, and generate a transformation matrix for transforming a 3D coordinate value to a 2D coordinate value, based on the first and second 2D image data and the first and second 3D coordinate information.

19 Claims, 3 Drawing Sheets

(51) Int. Cl.
  *G06F 17/16* (2006.01)
  *G06T 7/33* (2017.01)
(52) U.S. Cl.
  CPC . *H04N 13/246* (2018.05); *G06T 2207/10012* (2013.01); *G06T 2207/10084* (2013.01); *G06T 2207/30204* (2013.01)

(56) References Cited

U.S. PATENT DOCUMENTS

| | | | |
|---|---|---|---|
| 2011/0157373 A1* | 6/2011 | Ye | G06T 7/85 348/187 |
| 2012/0078510 A1* | 3/2012 | Ma | G05D 1/027 701/426 |
| 2016/0245899 A1 | 8/2016 | Rybski | |
| 2017/0287166 A1* | 10/2017 | Claveau | H04N 17/002 |
| 2019/0122386 A1* | 4/2019 | Wheeler | G01C 21/3602 |
| 2019/0122388 A1* | 4/2019 | Li | G06T 7/80 |
| 2019/0130605 A1* | 5/2019 | Yu | G06T 7/55 |
| 2020/0007843 A1* | 1/2020 | Zhang | H04N 13/128 |

OTHER PUBLICATIONS

Jiyoung Jung et al., "A novel 2.5D pattern for extrinsic calibration of ToF and camera fusion system", 2011 IEEE/RSJ International Conference on Intelligent Robots and Systems (IROS), San Francisco, CA, USA, Sep. 25-30, 2011, pp. 3290-3296.

Angel-Ivân Garcîa-Moreno et al., "LIDAR and Panoramic Camera Extrinsic Calibration Approach Using a Pattern Plane", MCPR 2013, LNCS vol. 7914, Springer-Verlag, Berlin, Heidelberg 2013, Jun. 26, 2013, pp. 104-113.

Weimin Wang et al., "Reflectance Intensity Assisted Automatic and Accurate Extrinsic Calibration of 3D LiDAR and Panoramic Camera Using a Printed Chessboard", Remote Sensing 2017, Nagoya University, Japan, Aug. 18, 2017, pp. 1-20.

Extended European Search Report dated Jun. 28, 2019, filed in counterpart European Patent Application No. 19161534.3, 9 pages.

* cited by examiner

COORDINATE CALIBRATION BETWEEN TWO DIMENSIONAL COORDINATE SYSTEM AND THREE DIMENSIONAL COORDINATE SYSTEM

CROSS-REFERENCE TO RELATED APPLICATION

This application is based upon and claims the benefit of priority from Japanese Patent Application No. 2018-042245, filed on Mar. 8, 2018, the entire contents of which are incorporated herein by reference.

FIELD

Embodiments described herein relate generally to an information processing apparatus that performs a coordinate calibration between a two dimensional coordinate system and a three dimensional coordinate system.

BACKGROUND

An information processing apparatus acquires information of a two-dimensional image captured by a two-dimensional camera and three-dimensional information obtained by a three-dimensional camera to perform coordinate calibration for transforming a coordinate value in a three-dimensional coordinate system to a coordinate value in a two-dimensional coordinate system. In order to perform the coordinate calibration, it is necessary to know characteristics of the two-dimensional camera and the three-dimensional camera in advance.

Conventionally, it is difficult for the information processing apparatus to perform coordinate calibration when characteristics of the two-dimensional camera and the three-dimensional camera are unknown.

DETAILED DESCRIPTION

According to an embodiment, an information processing apparatus performs coordinate calibration between a two-dimensional (2D) coordinate system and a three-dimensional (3D) coordinate system. The apparatus includes a 2D camera interface, a 3D camera interface, and a processor. The processor is configured to receive, from the 2D camera interface, first 2D image data of a flat plate at a first position and second 2D image data of the flat plate at a second position different from the first position, receive, from the 3D camera interface, first 3D coordinate information of the flat plate at the first position and second 3D coordinate information of the flat plate at the second position, and generate a transformation matrix for transforming a 3D coordinate value to a 2D coordinate value, based on the first and second 2D image data and the first and second 3D coordinate information.

Hereinafter, an embodiment is described in detail with reference to the accompanying drawings.

An image capturing device according to an embodiment acquires a two-dimensional image captured by a two-dimensional camera and three-dimensional information obtained by a three-dimensional camera. The image capturing device associates coordinates of points in the three-dimensional information with coordinates in the two-dimensional image. In other words, the image capturing device generates a transformation matrix to transform a coordinate system of the three-dimensional information to a coordinate system of the two-dimensional image.

Figure 1:
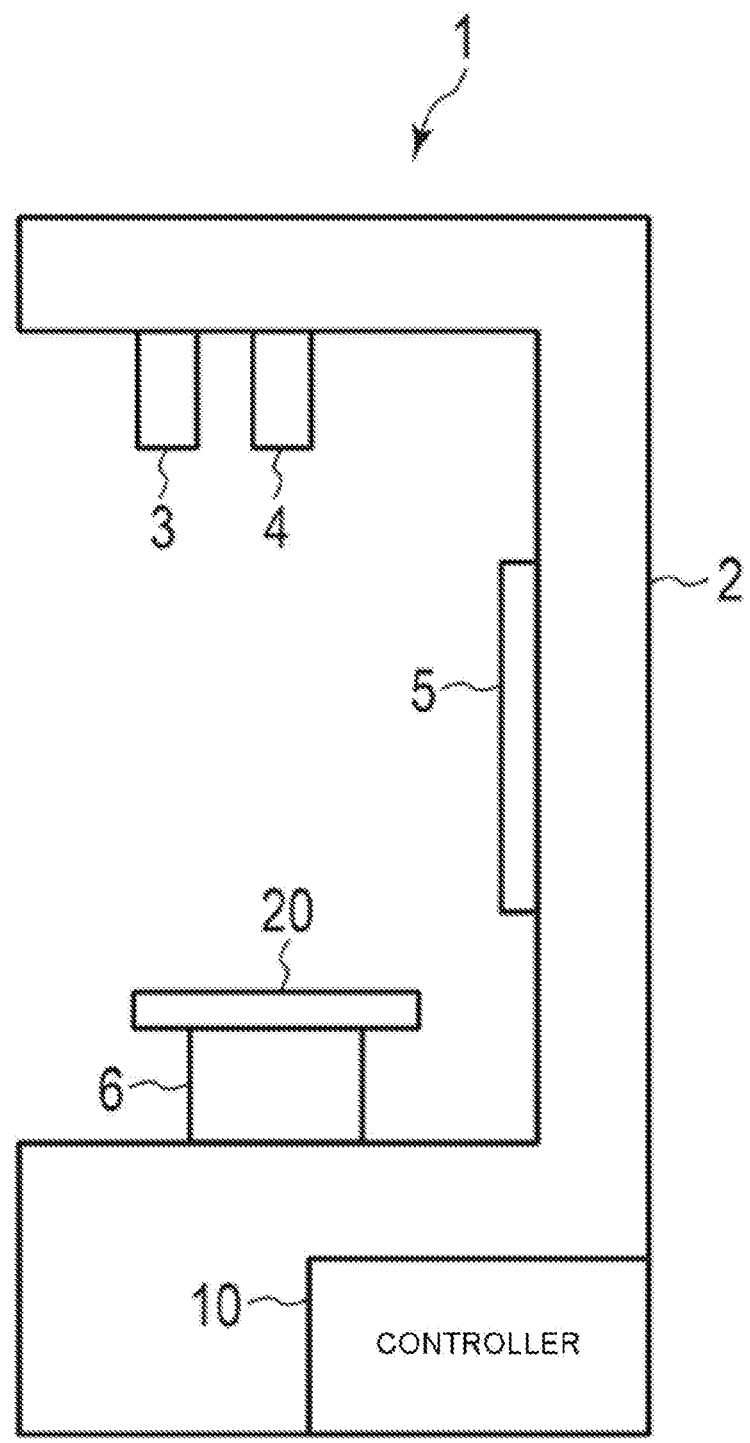
FIG. 1 is a diagram schematically illustrating an example of a configuration of an image capturing device according to an embodiment.

FIG. 1 is a block diagram schematically illustrating an example of a configuration of an image capturing device 1 (more generally referred to as an information processing apparatus) according to the embodiment. As shown in FIG. 1, the image capturing device 1 comprises a housing 2, a two-dimensional camera 3, a three-dimensional camera 4, an operation panel 5, an installation table 6, a controller 10 and a flat plate 20.

The housing 2 forms an outer shape of the image capturing device 1. The housing 2 is formed so that the installation table 6 and the flat plate 20 can be mounted. In the example shown in FIG. 1, the housing 2 has a U shape, and is formed so that the installation table 6 and the flat plate 20 can be loaded therein.

The two-dimensional camera 3 is directed downwards and mounted on an upper surface of the housing 2. The two-dimensional camera 3 photographs the flat plate 20 on the installation table 6. Specifically, the two-dimensional camera 3 is mounted to photograph the flat plate 20 from the above. The two-dimensional camera 3 may be mounted to photograph the flat plate 20 obliquely from the above. The position and orientation in which the two-dimensional camera 3 is mounted are not limited. The two-dimensional camera 3 transmits information of the captured image (two-dimensional image) to the controller 10.

The three-dimensional camera 4 is directed downwards at the upper part of the housing 2. The three-dimensional camera 4 measures a distance (for example, a distance from the three-dimensional camera 4 or a distance from the horizontal surface of the three-dimensional camera 4) from a reference point or a reference plane to parts of an article. Based on the measurement result, the three-dimensional camera 4 generates three-dimensional information indicating one or more points in which the distance is measured in a predetermined three-dimensional coordinate system. The three-dimensional information indicates coordinates of each of the one or more points in the predetermined three-dimensional coordinate system. The three-dimensional camera 4 transmits the generated three-dimensional information to the controller 10.

For example, the three-dimensional camera 4 includes a light source and a sensor for detecting reflected light of light emitted from the light source. The three-dimensional camera 4 measures a distance based on the reflected light of the light (visible light or invisible light) emitted from the light source. For example, the three-dimensional camera 4 may take a ToF (Time-of-Flight) method for measuring a distance to a measurement target based on a time until the emitted light is reflected by the measurement target and reaches the three-dimensional camera 4.

The three-dimensional camera 4 may calculate a distance based on a parallax of each image captured by each of the two cameras.

The configuration of the three-dimensional camera 4 is not limited to a specific configuration.

The operation panel 5 is an interface for receiving input of an instruction from an operator and displaying various kinds of information to the operator. The operation panel 5 includes an operation section for receiving the input of an instruction and a display section for displaying information.

The operation panel 5 transmits a signal indicating the operation received from the operator to the controller 10 as an operation of the operation section. Here, the operation section is a touch panel.

The operation panel 5 displays an image from the controller 10 as an operation of the display section. For example, the display section is a liquid crystal monitor. The display section is integrated with the touch panel which is the operation section.

The operation section may further include a keyboard or a numeric keypad.

The installation table 6 is mounted at the bottom of the housing 2. The installation table 6 supports the flat plate 20. The installation table 6 changes a height of the flat plate 20. Specifically, the installation table 6 changes a distance between the flat plate 20 and the three-dimensional camera 4 by changing the position of the flat plate 20.

For example, the installation table 6 supports the flat plate 20 at a different height according to the work of the operator. The installation table 6 may include a driving section such as a motor, and change the height of the flat plate 20 using the driving section.

The controller 10 controls the entire image capturing device 1. The controller 10 calibrates the two-dimensional camera 3 and the three-dimensional camera 4 based on the instruction from the operator. For example, the controller receives an input of an instruction for instructing calibration via the operation panel 5. The controller 10 displays various kinds of information to the operator on the operation panel 5.

The flat plate 20 is disposed on the installation table 6. The flat plate 20 is a rectangular plate. The flat plate 20 reflects the light emitted from the light source of the three-dimensional camera 4 at a predetermined reflectance. The flat plate 20 is described in detail below.

Figure 2:
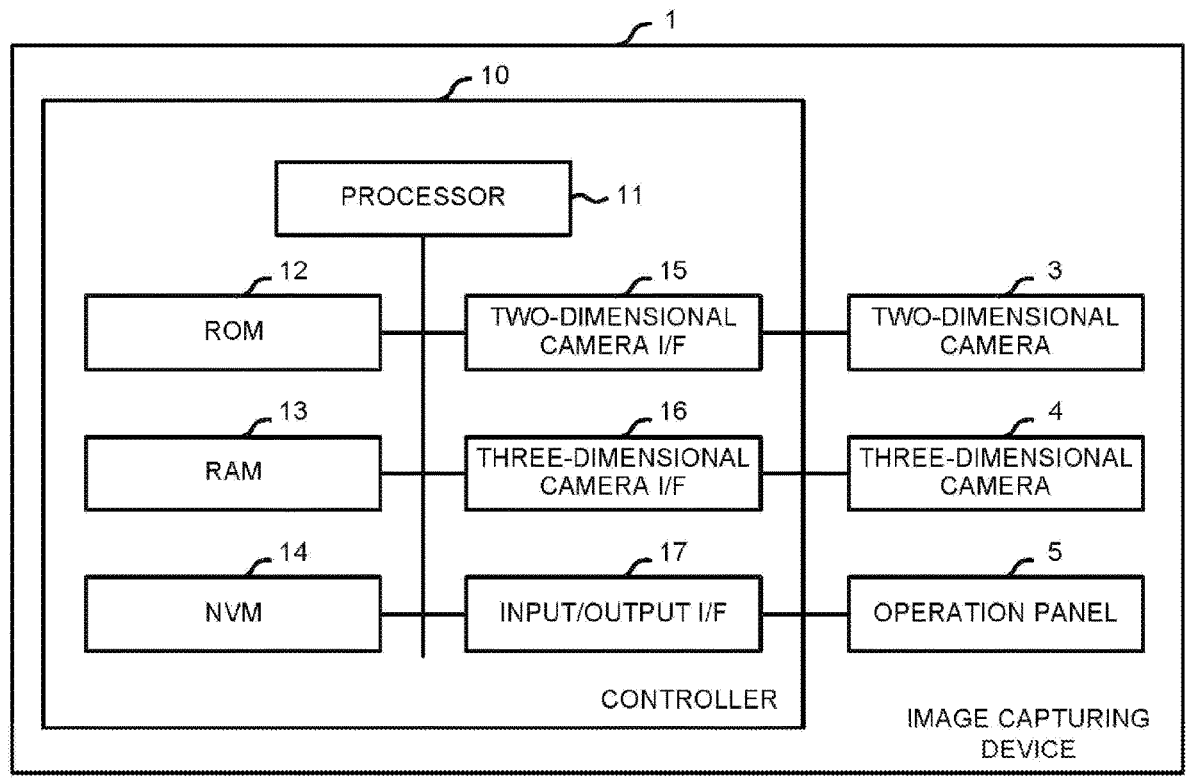
FIG. 2 is a block diagram illustrating an example of a configuration of the image capturing device according to the embodiment.

FIG. 2 is a block diagram illustrating an example of a configuration of the image capturing device 1. As shown in FIG. 2, the image capturing device 1 includes the controller 10, the two-dimensional camera 3, the three-dimensional camera 4 and the operation panel 5. The controller 10 is electrically connected to the two-dimensional camera 3, the three-dimensional camera 4 and the operation panel 5. The two-dimensional camera 3, the three-dimensional camera 4 and the operation panel 5 are as described above.

The controller 10 includes a processor 11, a ROM (Read Only Memory) 12, a RAM (Random Access Memory) 13, an NVM (Non-Volatile Memory) 14, a two-dimensional camera interface 15, a three-dimensional camera interface 16 and an input/output interface 17. The processor 11 is electrically connected to the ROM 12, the RAM 13, the NVM 14, the two-dimensional camera interface 15, the three-dimensional camera interface 16 and the input/output interface 17. The two-dimensional camera interface 15 is electrically connected to the two-dimensional camera 3. The three-dimensional camera interface 16 is electrically connected to the three-dimensional camera 4. The input/output interface 17 is electrically connected to the operation panel 5.

The processor 11 controls the operation of the entire controller 10. Specifically, the processor 11 controls the operation of the entire image capturing device 1. The processor 11 may include an internal cache and various interfaces. The processor 11 executes various kinds of processing by executing programs stored in the internal cache, the ROM 12, or the NVM 14 in advance.

A part of various functions performed by the processor 11 executing the programs may be performed by a hardware circuit. In this case, the processor 11 controls the functions performed by the hardware circuit.

The ROM 12 is nonvolatile memory in which a control program, control data, and the like are stored in advance. The control program and the control data stored in the ROM 12 are incorporated in advance according to a specification of the controller 10. The ROM 12 stores, for example, a program for controlling a circuit board of the controller 10.

The RAM 13 is volatile memory. The RAM 13 temporarily stores data being processed by the processor 11. The RAM 13 stores various application programs based on an instruction from the processor 11. The RAM 13 may store data necessary for executing the application program, an execution result of the application program, and the like.

The NVM 14 is nonvolatile memory capable of writing and rewriting data. The NVM 14 is, for example, an HDD (Hard Disk Drive), an SSD (Solid State Drive), an EEPROM® (Electrically Erasable Programmable Read-Only Memory), or a flash memory. The NVM 14 stores a control program, applications, various kinds of data and the like according to an operation purpose of the controller 10.

The two-dimensional camera interface 15 is used for transmitting and receiving data to and from the two-dimensional camera. For example, the two-dimensional camera interface 15 transmits a signal for instructing photographing to the two-dimensional camera 3 under the control of the processor 11. The two-dimensional camera interface 15 acquires information of a captured two-dimensional image from the two-dimensional camera 3. For example, the two-dimensional camera interface 15 may support a USB (Universal Serial Bus) connection.

The three-dimensional camera interface 16 is used for transmitting and receiving data to and from the three-dimensional camera 4. For example, the three-dimensional camera interface 16 transmits a signal for instructing the three-dimensional camera 4 to acquire three-dimensional information under the control of the processor 11. The three-dimensional camera interface 16 acquires the three-dimensional information from the three-dimensional camera 4. For example, the three-dimensional camera interface 16 may support a USB connection.

The input/output interface 17 is used for transmitting and receiving data to and from the operation panel 5. For example, the input/output interface 17 receives a signal indicating the operation received from the operation panel 5. The input/output interface 17 transmits information indicating a screen to be displayed to the operator to the operation panel 5 under the control of the processor 11. For example, the input/output interface 17 may support USB connection.

The image capturing device 1 may further include a component as required in addition to the components as shown in FIG. 1 and FIG. 2, or may exclude a specific configuration therefrom.

Next, the flat plate 20 is described.

Figure 3:
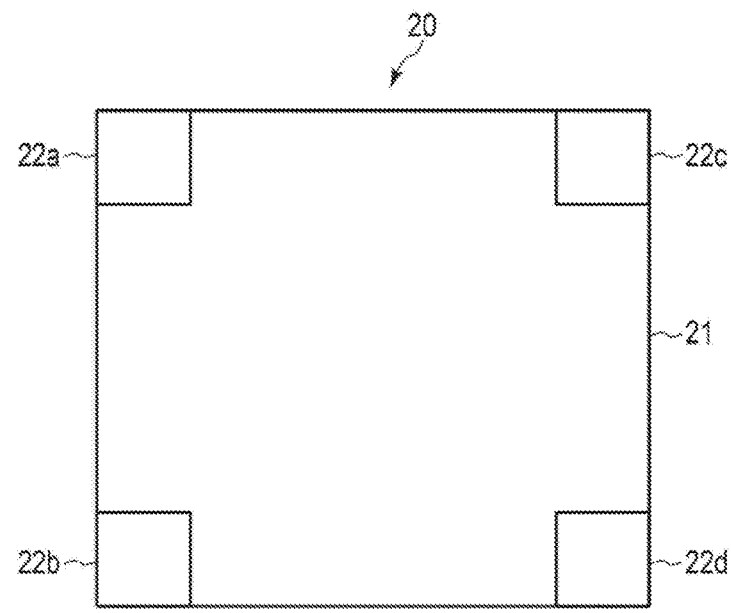
FIG. 3 is a diagram illustrating an example of a configuration of a flat plate in the embodiment.

FIG. 3 is a diagram illustrating an example of a configuration of the flat plate 20.

As shown in FIG. 3, the flat plate 20 has a rectangular shape.

The flat plate 20 includes a first reflecting plate 21 and a second reflecting plate 22.

The first reflecting plate 21 has a rectangular shape and has a predetermined size. The first reflecting plate 21 reflects the light emitted from the light source of the three-dimensional camera 4 at a predetermined reflectance (first reflectance). The first reflecting plate 21 is, for example, a metal plate.

The second reflecting plate 22 includes second reflecting plates 22a to 22d. The second reflecting plates 22a to 22d each have a rectangular shape and have a predetermined size smaller than that of the first reflecting plate 21. The second reflecting plates 22a to 22d are disposed at four corners of the first reflecting plate 21, respectively.

The second reflecting plates 22a to 22d reflect the light emitted from the light source of the three-dimensional camera at a predetermined reflectance (second reflectance) different from that of the first reflecting plate 21. For example, the second reflecting plates 22a to 22d each are made of the material different from that of the first reflecting plate 21.

The second reflecting plates 22a to 22d each may have a color different from that of the first reflecting plate 21. A predetermined code (for example, QR (Quick Response) Code®) may be indicated on the second reflecting plates 22a to 22d.

Next, the function performed by the processor 11 is described. The processor 11 performs the following functions by executing programs stored in the ROM 12 or the NVM 14.

First, the processor 11 has a function of acquiring information of a two-dimensional image and three-dimensional information obtained by photographing the flat plate 20 by the two-dimensional camera 3 and the three-dimensional camera 4 respectively at a plurality of object distances.

The processor 11 sets a distance (object distance) between the two-dimensional camera 3 or the three-dimensional camera and the flat plate 20 as a first object distance. Specifically, the processor 11 places the flat plate 20 at a first position. The distance between the flat plate 20 and the two-dimensional camera 3 and the distance between the three-dimensional camera 4 and the flat plate 20 may be different from each other. Here, the processor 11 sets the two distances to predetermined distances. In other words, the object distance may include the two distances.

For example, the processor 11 adjusts the height of the installation table 6 to a first height corresponding to the first object distance. For example, the processor 11 may drive the installation table 6 to fix it at the first height. The processor 11 may display a message for prompting the operator to fix the installation table 6 at the first height on the operation panel 5.

If the object distance is set to the first object distance, the processor 11 photographs the flat plate 20 using the two-dimensional camera 3. The processor 11 acquires information of a two-dimensional image (first two-dimensional image) obtained by photographing the flat plate 20 from the two-dimensional camera 3.

The processor 11 photographs the flat plate 20 using the three-dimensional camera 4. The processor 11 acquires three-dimensional information (first three-dimensional information) obtained by photographing the flat plate 20 from the three-dimensional camera 4.

The processor 11 may acquire the information of the two-dimensional image and the three-dimensional information at the same time. The processor 11 may acquire the information of the two-dimensional image and the three-dimensional information in a predetermined order.

If the information of the two-dimensional image and the three-dimensional information are acquired at the first object distance, the processor 11 sets the object distance to the second object distance different from the first object distance. Specifically, the processor 11 places the flat plate 20 at a second position different from the first position. For example, the processor 11 adjusts the height of the installation table 6 to a second height corresponding to the second object distance. An example of the operation for adjusting the height of the installation table 6 by the processor 11 is as described above.

If the object distance is set to the second object distance, the processor 11 photographs the flat plate 20 using the two-dimensional camera 3. The processor 11 acquires information of a two-dimensional image (second two-dimensional image) obtained by photographing the flat plate 20 from the two-dimensional camera 3.

The processor 11 photographs the flat plate 20 using the three-dimensional camera 4. The processor 11 acquires three-dimensional information (second three-dimensional information) obtained by photographing the flat plate 20 from the three-dimensional camera 4.

The processor 11 may acquire a two-dimensional image and three-dimensional information at a third object distance different from the first and second object distances. The number of object distances set by the processor 11 is not limited.

The processor 11 has a function of specifying a point in the three-dimensional information corresponding to a point in the two-dimensional image. Specifically, the processor 11 specifies coordinates of a point in the same photographed area in the two-dimensional image and the three-dimensional information.

For example, the processor 11 acquires the two-dimensional image and the three-dimensional information at a predetermined object distance. If the two-dimensional image and the three-dimensional information are acquired, the processor 11 acquires coordinates (two-dimensional vertex coordinates) of four vertices (two-dimensional vertices) of the flat plate 20, that is, four outer vertices of the second reflecting plates, from the two-dimensional image.

For example, the processor 11 extracts edges of the flat plate 20 by extracting edges in the two-dimensional image. The processor 11 specifies the four two-dimensional vertex coordinates of the flat plate 20 based on the extracted edges.

When the color of the first reflecting plate 21 is different from that of the second reflecting plate 22, the processor 11 may specify the position of the color of the second reflecting plate 22 to specify four two-dimensional vertex coordinates.

When a code is formed on the second reflecting plate 22, the processor 11 may specify the four two-dimensional vertex coordinates by reading the codes.

The method by which the processor 11 specifies the two-dimensional vertex coordinates of the flat plate 20 is not limited to a specific method.

The processor 11 specifies coordinates (three-dimensional vertex coordinates) of the four vertices (three-dimensional vertices) of the flat plate 20 in the three-dimensional information.

As described above, the flat plate 20 has the second reflecting plate 22 having reflectance different from that of the first reflecting plate 21 at the four corners. Because of the difference in reflectance, the three-dimensional camera 4 can detect the second reflecting plate 22 in a different plane from the first reflecting plate 21. Specifically, the three-dimensional camera 4 recognizes an area of the second reflecting plate 22 closer to or farther from that of the first reflecting plate 21.

The processor 11 specifies an area closer to or farther from the first reflecting plate 21 as the area of the second reflecting plate 22. The processor 11 specifies three-dimensional vertex coordinates based on the position of the area of the second reflecting plate 22.

The processor 11 may specify three-dimensional vertex coordinates by creating a binary image using a distance (density) slightly above the installation table 6 as a threshold value in the three-dimensional information and acquiring a contour line of the flat plate 20. The processor 11 may specify the three-dimensional vertex coordinates by detecting a plane from a point group constituted by points in the three-dimensional information.

The method by which the processor 11 specifies the three-dimensional vertex coordinates of the flat plate 20 is not limited to a specific method.

The processor 11 specifies four three-dimensional vertex coordinates as points corresponding to the four two-dimensional vertex coordinates.

For example, the processor 11 specifies the two-dimensional vertex coordinates (first two-dimensional coordinates) of the four two-dimensional vertices and the three-dimensional vertex coordinates of the four three-dimensional vertices (first three-dimensional coordinates) at the first object distance. Specifically, the processor specifies four three-dimensional vertex coordinates (first three-dimensional coordinates) corresponding to four two-dimensional vertex coordinates (first two-dimensional coordinates) at the first object distance.

For example, the processor 11 specifies the two-dimensional vertex coordinates (second two-dimensional coordinates) of the four two-dimensional vertices and the three-dimensional vertex coordinates of the four three-dimensional vertices (second three-dimensional coordinates) at the second object distance. Specifically, the processor specifies four three-dimensional vertex coordinates (second three-dimensional coordinates) corresponding to four two-dimensional vertex coordinates (second two-dimensional coordinates) at the second object distance.

The processor 11 has a function of generating a transformation matrix for transforming the three-dimensional coordinates in the three-dimensional information to the two-dimensional coordinates in the two-dimensional image based on the associated two-dimensional vertex coordinates and three-dimensional vertex coordinates at each object distance.

Specifically, the processor 11 calculates a value of an element of the transformation matrix.

For example, the transformation matrix is a projective transformation matrix. The transformation matrix may be an affine transformation matrix.

The processor 11 calculates a transformation matrix from the associated four two-dimensional vertex coordinates and four three-dimensional vertex coordinates (sets) at each object distance.

For example, the processor 11 calculates a transformation matrix at the first object distance from the four two-dimensional vertex coordinates and the four three-dimensional vertex coordinates at the first object distance. The processor 11 similarly calculates a transformation matrix at the second object distance.

The processor 11 estimates a transformation matrix at any object distance based on the transformation matrix at the first object distance and the transformation matrix at the second object distance. For example, the processor 11 linearly estimates the value of each element of the transformation matrix at the object distance at any object distance.

When there are three or more sets, the processor 11 calculates a transformation matrix at three or more object distances. The processor 11 estimates the transformation matrix at any object distance from the transformation matrix at three or more object distances. The processor 11 may linearly estimate the value of each element of the transformation matrix at any object distance. The processor may estimate the value of each element of the transformation matrix at any object distance using an n-th power approximate expression.

Next, an example of a calibration operation performed by the processor 11 is described.

Figure 4:
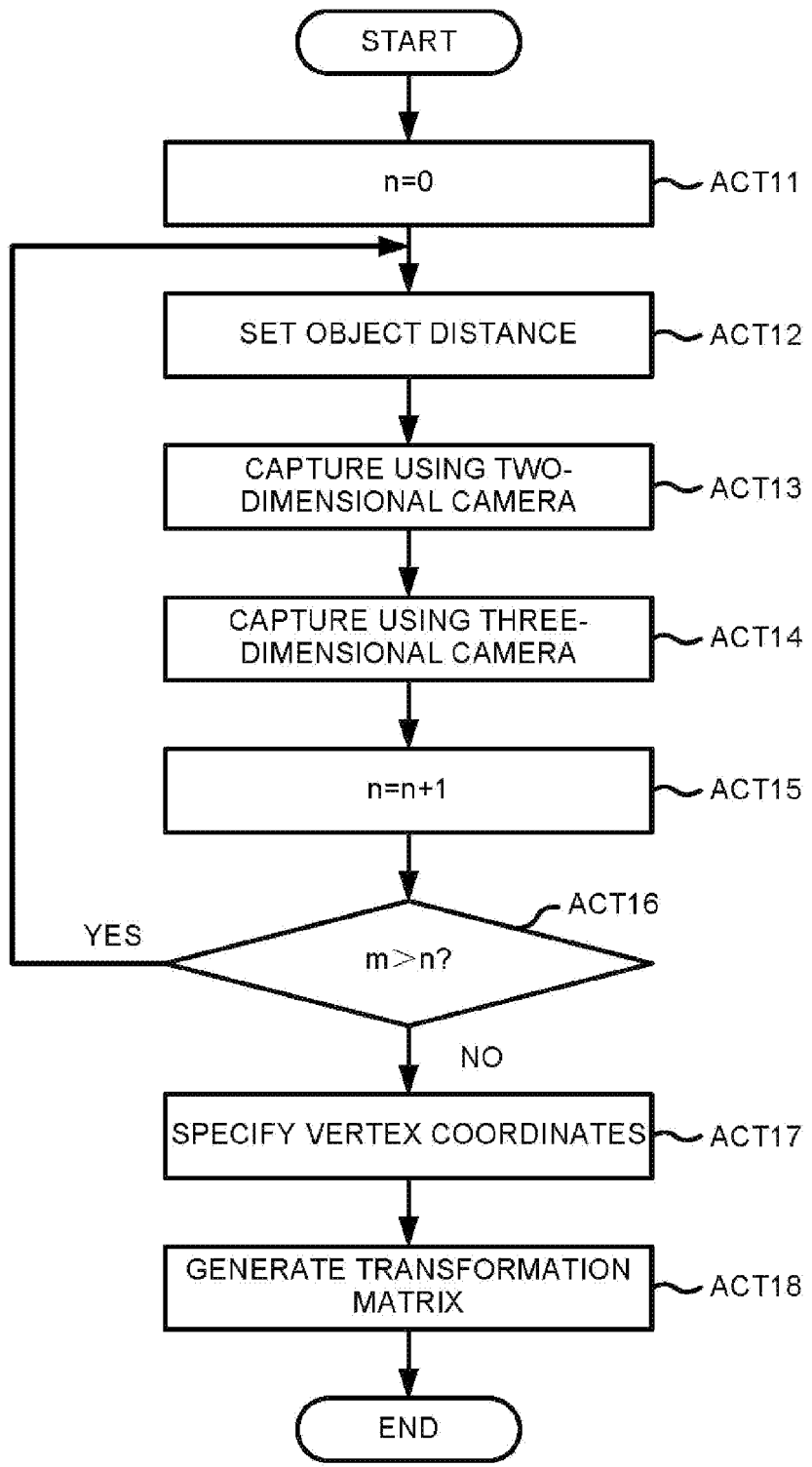
FIG. 4 is a flowchart depicting an example of an operation executed by the image capturing device according to the embodiment.

FIG. 4 is a flowchart depicting an example of a calibration operation performed by the processor 11. Here, it is assumed that the processor 11 receives an input of an operation for instructing execution of the calibration via the operation panel 5.

First, the processor 11 resets n (ACT 11). Specifically, the processor 11 sets n=0. Here, n is the number of sets composed of the two-dimensional image and the three-dimensional information acquired by the processor 11.

If n is reset, the processor 11 sets a predetermined object distance (e.g., the first or second object distance) (ACT 12). If the predetermined object distance is set, the processor 11 acquires information of a two-dimensional image including the flat plate 20 from the two-dimensional camera 3 (ACT 13).

If the information of the two-dimensional image including the flat plate 20 is acquired, the processor 11 acquires three-dimensional information including the flat plate 20 from the three-dimensional camera 4 (ACT 14).

If the three-dimensional information including the flat plate 20 is acquired, the processor 11 increments n by 1 (ACT 15). If n is incremented by 1, the processor 11 determines whether m>n (ACT 16). Here, m is the number of object distances set for acquiring the two-dimensional image and the three-dimensional information.

If it is determined that m>n is not satisfied (No in ACT 16), the process returns to ACT 12.

If it is determined that m>n (Yes in ACT 16), the processor 11 specifies four two-dimensional vertex coordinates and four three-dimensional vertex coordinates at each object distance (ACT 17). If the four two-dimensional vertex coordinates and four three-dimensional vertex coordinates at each object distance are specified, the processor 11 generates a transformation matrix based on the specified two-dimensional vertex coordinates and three-dimensional vertex coordinates (ACT 18).

If the transformation matrix is generated, the processor 11 terminates the above operation.

The processor 11 may execute the processing in ACT 13 after ACT 14. The processor 11 may simultaneously execute the processing in ACT 13 and ACT 14. The processor 11 may specify the four two-dimensional vertex coordinates and four three-dimensional vertex coordinates after ACT 14.

The flat plate 20 may have a circular shape, an oval shape, a rectangular shape, a parallelogram shape, or a polygonal shape. The shape of the flat plate 20 is not limited to a specific shape.

The second reflecting plate 22 may have a circular shape, an oval shape, a rectangular shape, a parallelogram shape, or a polygonal shape. The shape of the second reflecting plate 22 is not limited to a specific shape.

The flat plate 20 may not have the second reflecting plate 22.

The image capturing device configured as described above acquires information of two-dimensional images and three-dimensional information by setting a plurality of object distances. The image capturing device specifies the two-dimensional vertex coordinates and the three-dimensional vertex coordinates from the information of the two-dimensional image and the three-dimensional information at each object distance. The image capturing device generates a transformation matrix (e.g., Affine transformation matrix or nomography transformation matrix) for transforming the three-dimensional coordinates in the three-dimensional information to the two-dimensional coordinates in the two-dimensional image based on the specified two-dimensional vertex coordinates and three-dimensional vertex coordinates. As a result, the image capturing device can effectively perform calibration. Further, it is possible to determine a relationship between a three-dimensional image and a two-dimensional image using the transformation matrix, when characteristics of a camera to capture the three-dimensional image or the two-dimensional image are unknown.

The image capturing device can acquire information of two-dimensional images and three-dimensional information at different object distances without using a three-dimensional object as an object to be captured. As a result, the image capturing device can easily perform calibration.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An information processing apparatus that performs coordinate calibration between a two-dimensional (2D) coordinate system and a three-dimensional (3D) coordinate system, said apparatus comprising:
    a 2D camera interface connectable to a 2D camera;
    a 3D camera interface connectable to a 3D camera;
    a driving mechanism configured to move a flat plate placed horizontally in a height direction closer to or apart from the 2D camera and the 3D camera; and
    a processor configured to:
        control the driving mechanism to move the flat plate placed horizontally in the height direction to a first position and to a second position different from the first position;
        receive, from the 2D camera interface, first 2D image data of the flat plate at the first position and second 2D image data of the flat plate at the second position;
        receive, from the 3D camera interface, first 3D coordinate information of the flat plate at the first position and second 3D coordinate information of the flat plate at the second position; and
        generate a transformation matrix for transforming a 3D coordinate value of a point in a 3D coordinate system to a 2D coordinate value of the point in a 2D coordinate system, based on the first and second 2D image data and the first and second 3D coordinate information.

2. The information processing apparatus according to claim 1, wherein the processor is configured to:
    specify, from the first 3D coordinate information, four first 3D coordinate values corresponding to four first 2D coordinate values in the first 2D image data,
    specify, from the second 3D coordinate information, four second 3D coordinate values corresponding to four second 2D coordinate values in the second 2D image data; and
    generate the transformation matrix based on the four first 2D coordinate values, the four first 3D coordinate values, the four second 2D coordinate values, and the four second 3D coordinate values.

3. The information processing apparatus according to claim 2, wherein
    the flat plate has a rectangular shape, and
    the four first 2D coordinate values and the four second 2D coordinate values are coordinate values of four vertexes of the flat plate.

4. The information processing apparatus according to claim 3, wherein
    the flat plate includes a first reflecting plate having a first reflectance, and four second reflecting plates at four corners of the first reflecting plate, each of the four second reflecting plates having a second reflectance different from the first reflectance.

5. The information processing apparatus according to claim 4, wherein
    the 3D camera measures a distance to the flat plate by acquiring light emitted from a predetermined light source and reflected by the first reflecting plate or one of the four second reflecting plates, and
    the processor specifies, as the four first 3D coordinate values, four positions of the four second reflecting plates based on the first 3D coordinate information.

6. The information processing apparatus according to claim 1, further comprising:
    the 2D camera;
    the 3D camera; and
    the flat plate.

7. The information processing apparatus according to claim 1, wherein the processor is configured to:
    generate a first transformation matrix for transforming a 3D coordinate value of a point in a 3D coordinate system to a 2D coordinate value of the point in a 2D coordinate system corresponding to a surface of the flat plate at the first position;
    generate a second transformation matrix for transforming a 3D coordinate value of a point in a 3D coordinate system to a 2D coordinate value of the point in a 2D coordinate system corresponding to the surface of the flat plate at the second position; and
    generate a third transformation matrix for transforming a 3D coordinate value of a point in a 3D coordinate system to a 2D coordinate value of the point in a 2D coordinate system corresponding to the surface of the flat plate at a third position different from the first and second positions, based on the first transformation matrix and the second transformation matrix.

8. The information processing apparatus according to claim 7, wherein
the processor generates the third transformation matrix based on a linear approximation of the first and second transformation matrices.

9. The information processing apparatus according to claim 7, wherein
the processor generates the third transformation matrix based on an n-th power approximation of the first and second transformation matrices.

10. A coordinate calibration method comprising:
obtaining, with a two-dimensional (2D) camera, first 2D image data by two-dimensionally photographing a flat plate placed horizontally at a first position in a height direction;
obtaining, with a three-dimensional (3D) camera, first 3D coordinate information by three-dimensionally photographing the flat plate placed horizontally at the first position in a height direction;
moving, by a driving mechanism, the flat plate placed horizontally in the height direction closer to or apart from the 2D camera and the 3D camera, to a second position in the height direction different from the first position;
obtaining, with the 2D camera, second 2D image data by two-dimensionally photographing the flat plate placed horizontally at the second position in the height direction;
obtaining, with the 3D camera, second 3D coordinate information by three-dimensionally photographing the flat plate placed horizontally at the second position in the height direction; and
generating a transformation matrix for transforming a 3D coordinate value of a point in a 3D coordinate system to a 2D coordinate value of the point in a 2D coordinate system, based on the first and second 2D image data and the first and second 3D coordinate information.

11. The coordinate calibration method according to claim 10, further comprising:
specifying, from the first 3D coordinate information, four first 3D coordinate values corresponding to four first 2D coordinate values in the first 2D image data; and
specifying, from the second 3D coordinate information, four second 3D coordinate values corresponding to four second 2D coordinate values in the second 2D image data, wherein
the transformation matrix is generated based on the four first 2D coordinate values, the four first 3D coordinate values, the four second 2D coordinate values, and the four second 3D coordinate values.

12. The coordinate calibration method according to claim 11, wherein
the flat plate has a rectangular shape, and
the four first 2D coordinate values and the four second 2D coordinate values are coordinate values of four vertexes of the flat plate.

13. The coordinate calibration method according to claim 12, wherein
the flat plate includes a first reflecting plate having a first reflectance, and four second reflecting plates at four corners of the first reflecting plate, each of the four second reflecting plates having a second reflectance different from the first reflectance.

14. The coordinate calibration method according to claim 13, wherein
the three-dimensionally photographing the flat plate at the first position includes measuring a distance to the flat plate by acquiring light emitted from a predetermined light source and reflected by the first reflecting plate or one of the four second reflecting plates, and
four positions of the four second reflecting plates are specified as the four first 3D coordinate values based on the first 3D coordinate information.

15. The coordinate calibration method according to claim 10, further comprising:
generating a first transformation matrix for transforming a 3D coordinate value of a point in a 3D coordinate system to a 2D coordinate value of the point in a 2D coordinate system corresponding to a surface of the flat plate at the first position,
generating a second transformation matrix for transforming a 3D coordinate value of a point in a 3D coordinate system to a 2D coordinate value of the point in a 2D coordinate system corresponding to the surface of the flat plate at the second position, wherein
said generating a transformation matrix comprises generating a third transformation matrix for transforming a 3D coordinate value of a point in a 3D coordinate system to a 2D coordinate value of the point in a 2D coordinate system corresponding to the surface of the flat plate at a third position different from the first and second positions, based on the first transformation matrix and the second transformation matrix.

16. The coordinate calibration method according to claim 15, wherein
the third transformation matrix is generated based on a linear approximation of the first and second transformation matrices.

17. The coordinate calibration method according to claim 15, wherein
the third transformation matrix is generated based on an n-th power approximation of the first and second transformation matrices.

18. The information processing apparatus according to claim 6, wherein the 2D camera and the 3D camera are positioned above the flat plate.

19. The coordinate calibration method according to claim 10, wherein the 2D camera and the 3D camera are positioned above the flat plate.

* * * * *